3,485,633
ELECTROPHORETIC IMAGING PROCESS EMPLOYING METALLIC LAKES OF FLUORESCEIN DERIVATIVES AS THE ELECTRICALLY PHOTOSENSITIVE MATERIAL
Vsevolod Tulagin, Rochester, and Santokh S. Labana, Webster, N.Y., assignors to Xerox Corporation, Rochester, N.Y., a corporation of New York
Filed June 27, 1966, Ser. No. 560,601
Int. Cl. G03c 1/72; G03g
U.S. Cl. 96—89                           11 Claims

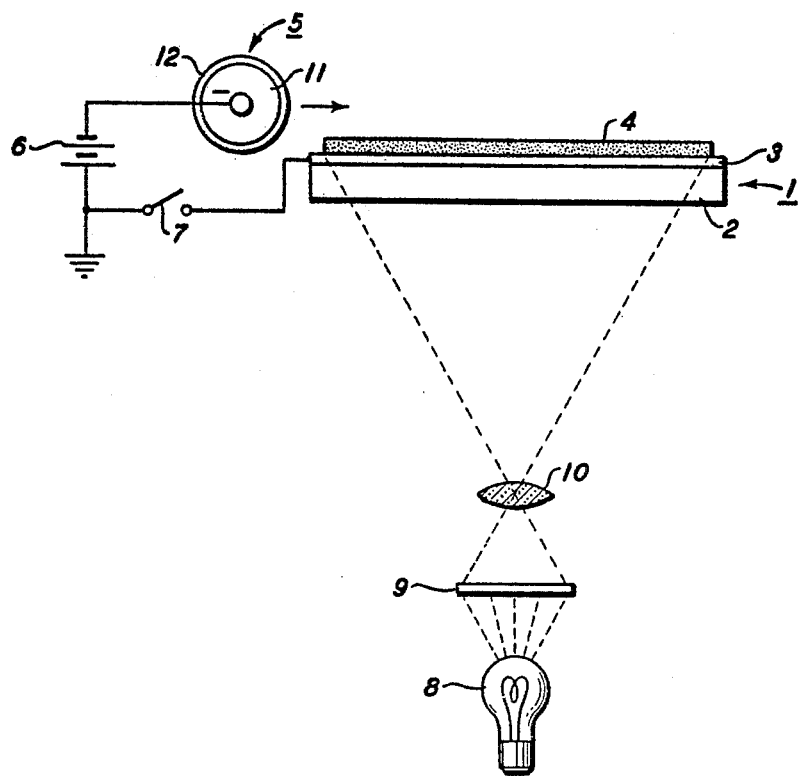

ABSTRACT OF THE DISCLOSURE

Electrophoretic imaging processes utilizing metallic lakes of compositions having the general formula:

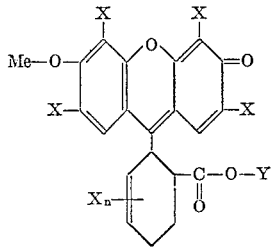

wherein:
  each X is selected from the group consisting of H, $NO_2$ and the halogens;
  Me is a metal ion selected from groups consisting of lead, aluminum, and chromium;
  Y is selected from the group consisting of H and lower alkyl radicals; and
  $n$ is a positive integer from 1 to 4, are disclosed.

This invention relates in general to imaging methods. More specifically, the invention concerns the use of electrically photosensitive pigments in electrophoretic imaging systems.

There has been recently developed an electrophoretic imaging system capable of producing color images which utilize photoconductive particles. The process is described in detail and claimed in copending applications Ser. Nos. 384,737, now U.S. Patent 3,384,565; 384,681, abandoned in favor of continuation-in-part application Ser. No. 655,023, now U.S. Patent 3,384,566; and 384,680, abandoned in favor of continuation-in-part application Ser. No. 518,041, now U.S. Patent 3,383,993, all filed July 23, 1964. In such an imaging system, various colored light absorbing particles are suspended in a non-conductive liquid carrier. The suspension is placed between electrodes, subjected to a potential difference and exposed to an image. As these steps are completed, selective particle migration takes place in image configuration, providing a visible image at one or both of the electrodes. An essential component of the system is the suspended particles which must be intensely colored and electrically photosensitive and which apparently undergo a net change in charge polarity upon exposure to activating radiation, through interaction with one of the electrodes. The images are produced in color because mixtures of two or more differently colored particles which are each sensitive only to light of a specific wavelength or narrow range of wavelengths are used.

Pigments used in the imaging particles for this system must have both intense pure colors and be highly photosensitive. The pigments of the prior art often lack the purity and brilliance of color, the high degree of photosensitivity, and/or the preferred correlation between the peak spectral response and peak photosensitivity necessary for use in such a system.

It is therefore, an object of this invention to provide novel electrophoretic imaging processes which overcome the above noted deficiencies.

It is another object of this invention to provide highly photosensitive magenta pigments.

It is another object of this invention to provide a multicolor particle mix capable of producing improved color images by electrophoresis.

It is still another object of this invention to provide novel polychromatic electrophoretic imaging systems.

The foregoing objects, and others, are accomplished in accordance with this invention, fundamentally, by providing novel electrophoretic imaging processes utilizing metallic lakes of compositions having the general formula:

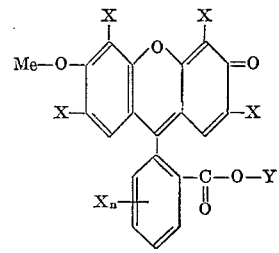

wherein:
  each X is selected from the group consisting of H, $NO_2$ and the halogens;
  Me is a metal ion selected from groups consisting of lead, aluminum, chromium;
  Y is selected from the group consisting of H and lower alkyl radicals; and
  $n$ is a postive integer from 1 to 4.

The compositions, which are derivatives of fluorescein, produced by the above reaction have the common characteristics of brilliant, intense colors; of insolubility in water and the common organic solvents, e.g., benzene, toluene, acetone, carbontetrachloride, chloroform, alcohols, and aliphatic hydrocarbons; and of unusually high photosensitive response.

Of the compositions within the general formula listed above, the lead lakes of 2,7-dinitro-4,5-dibromo fluorescein and of 2,4,5,7-tetrabromo fluorescein are preferred for use in electrophoretic imaging processes since they have especially pure color and are most highly photosensitive. Since the shade or tone of the compositions and the spectral and photosensitive responses vary slightly depending upon the substituent used, intermediate values of these variables may be obtained by mixing several of the different compositions.

An exemplary electrophoretic imaging system is schematically shown in the figure. This system is suitable for both monochromatic and polychromatic image formation.

Referring now to the figure, there is seen a transparent electrode generally designated 1 which, in this exemplary instance, is made up of a layer of optically transparent glass 2 overcoated with a thin optically transparent layer 3 of tin oxide, commercially available under the name NESA glass. This electrode will hereafter be referred to as the "injecting electrode." Coated on the surface of injecting electrode 1 is a thin layer 4 of finely divided photosensitive particles dispersed in an insulating liquid carrier. The term "photosensitive," for the purposes of this application, refers to the properties of a particle which, once attracted to the injecting electrode, will migrate away from it under the influence of an applied electric field when it is exposed to suitable actinic electromagnetic radiation. For a detailed theoretical explanation of the apparent mechanism of operation of the invention, see the above mentioned copending applications Ser. Nos. 384,737; 384,361 and 384,680, the disclosure of which are incorporated herein by reference. Liquid suspension 4 may also contain a sensitizer and/or a binder for the pigment particles which is at least partially soluble in the suspending or carrier liquid as will be explained in greater detail below. Adjacent to the liquid suspension 4 is a second electrode 5, hereinafter called the "blocking electrode," which is connected to one side of the potential source 6 through a switch 7. The opposite side of potential source 6 is connected to the injecting electrode 1 so that when switch 7 is closed, an electric field is applied across the liquid suspension 4 between electrodes 1 and 5. An image projector made up of a light source 8, a transparency 9, and a lens 10 is provided to expose the dispersion 4 to a light image of the original transparency 9 to be reproduced. Electrode 5 is made in the form of a roller having a conductive central core 11 connected to the potential source 6. The core is covered with a layer of a blocking electrode material 12, which may be Baryta paper. The pigment suspension is exposed to the image to be reproduced while a potential is applied across the blocking and injecting electrodes by closing switch 7. Roller 5 is caused to roll across the top surface of injecting electrode 1 with switch 7 closed during the period of image exposure. This light exposure causes exposed pigment particles originally attracted to electrode 1 to migrate through the liquid and adhere to the surface of the blocking electrode, leaving behind a particulate image on the injecting electrode surface which is a duplicate of the original transparency 9. After exposure, the relatively volatile carrier liquid evaporates off, leaving behind the image. This particulate image may then be fixed in place as, for example, by placing a lamination over its top surface or by virtue of a dissolved binder material in the carrier liquid such as paraffin wax or other suitable binder that comes out of solution as the carrier liquid evaporates. About 3% to 6% by weight of paraffin binder in the carrier has been found to produce good results. The carrier liquid itself may be molten paraffin wax or other suitable binder. In the alternative, the pigment image remaining on the injecting electrode may be transferred to another surface and fixed thereon. As explained in greater detail below, this system can produce either monochromatic or polychromatic images depending upon the type and number of different pigments suspended in the carrier liquid and the color of light to which this suspension is exposed in the process.

Any suitable insulating liquid may be used as the carrier for the pigment particles in the system. Typical carrier liquids are decane, dodecane, N-tetradecane, paraffin, beeswax or other thermoplastic materials, Sohio Odorless Solvent 3440 (a kerosene fraction available from Standard Oil Company of Ohio), and Isopar–G (a long chain saturated aliphatic hydrocarbon available from Humble Oil Company of New Jersey). Good quality images have been produced with voltages ranging from 300 to 5,000 volts in the apparatus of the figure.

In a monochromatic system, particles of a single color are dispersed in the carrier liquid and exposed to a black-and-white image. A single color image results, corresponding to conventional black-and-white photography. In a polychromatic system, the particles are selected so that those of different colors respond to different wavelengths in the visible spectrum corresponding to their principal absorption bands. Also, the pigments should be selected so that their spectral response curves do not have substantial overlap, thus allowing for color separation and subtractive multicolor image formation. In a typical polychromatic system, the particle dispersion should include cyan colored particles sensitive mainly to red light, magenta particles sensitive mainly to green light and yellow colored particles sensitive mainly to blue light. When mixed together in a carrier liquid, these particles produce a black appearing liquid. When one or more of the particles are caused to migrate from base electrode 11 toward an upper electrode, they leave behind particles which produce a color equivalent to the color of the impinging light. Thus, for example, red light exposure causes the cyan colored pigment to migrate, leaving behind the magenta and yellow pigments which combine to produce red in the final image. In the same manner, blue and green colors are reproduced by removal of yellow and magenta, respectively. When white light impinges upon the mix, all pigments migrate, leaving behind the color of the white or transparent substrate. No exposure leaves behind all pigments which combine to produce a black image. This is an ideal technique of substrative color imaging in that the particles are not only each composed of a single component, but, in addition, they perform the dual functions of final image colorant and photosensitive medium.

It has been found that the compounds of the general formula given above are surprisingly effective when used in either a single or multicolor electrophoretic imaging system. Their good spectral response and high photosensitivity result in dense, brilliant images.

Any suitable different colored photosensitive pigment particles having the desired spectral responses may be used, with the pigments of this invention to form a particle mix in a carrier liquid for color imaging. From about 2 to about 10 percent pigment by weight have been found to produce good results. The addition of small amounts (generally ranging from 0.5 to 5 mol percent) of electron donors or acceptors to the suspensions may impart significant increases in system photosensitivity.

The following examples further specifically define the present invention with respect to the use of the compositions of the general formula given above in electrophoretic imaging processes. Parts and percentages are by weight unless otherwise indicated. The examples below are intended to illustrate various preferred embodiments of the electrophoretic imaging process of the present invention.

All of the following examples are carried out in an apparatus of the general type illustrated in the figure with the imaging mix 4 coated on a NESA glass substrate through which exposure is made. The NESA glass surface is connected in series with a switch, a potential source, and the conductive center of a roller having a coating of Baryta paper on its surface. The roller is approximately 2½ inches in diameter and is moved across the plate surface at about 4 centimeters per second. The plate employed is roughly 4 inches square and is exposed with a light intensity of 1500 foot candles as measured on the uncoated NESA glass surface. Unless otherwise indicated, 7 percent by weight of the indicated pigments in each example are suspended in Sohio Odorless Solvent 3440 and the magnitude of the applied potential is 3000 volts. All pigments which have a relatively large particle size as received commercially or as made are ground in a ball mill for 48 hours to reduce their size to provide a more stable dispersion which improves the resolution of the final images. The exposure is made with a 3200° K. lamp through a 0.30 neutral density step wedge filter to measure the sensitivity of the suspensions to white light and then Wratten filters 29, 61 and 47b are individually superimposed over the light source in separate tests to measure the sensitivity of the suspensions to red, green and blue light respectively.

EXAMPLE I

About 7 parts of the lead lake of 2,4,5,7-tetrabromo fluorescein is suspended in about 100 parts of Sohio Odorless Solvent 3440. The mixture is coated on the NESA glass substrate and a negative potential is imposed on the roller electrode. The plate exposed through a Wratten 29 filter and the neutral density step wedge filter, thus exposing the plate to red light. The results are tabulated in Table I below.

EXAMPLE II

A test is run as in Example I above, except that a Wratten 61 filter is used in place of the Wratten 29 filter, thus exposing the plate to green light. The results are tabulated in Table I.

EXAMPLE III

A test is run as in Example I above, except that a Wratten 47b filter is used in place of the Wratten 29 filter, thus exposing the plate to blue light. The results are tabulated in Table I.

EXAMPLE IV

A test is run as in Example I above, except that no color filter is used, thus exposing the plate to white light. The results are tabulated in Table I.

EXAMPLE V

A test is run as in Example I above, except that the roller potential is positive rather than negative. As in Example I, a Wratten 29 filter is used to expose the plate to red light. The results are tabulated in Table I.

EXAMPLE VI

A test is run as in Example V above, except that a Wratten 61 filter is used in place of the Wratten 29 filter, thus exposing the plate to green light. See Table I for results.

EXAMPLE VII

A test is run as in Example V above, except that a Wratten 47b filter is used in place of the Wratten 29 filter, thus exposing the plate to blue light. See Table I for results.

EXAMPLE VIII

A test is run as in Example V above, except that no Wratten filter is used, thus exposing the plate to white light. See Table I for results.

EXAMPLE IX

About 7 parts of the lead lake of 2,4,5,7-tetrabromo fluorescein methyl ester is suspended in about 100 parts Sohio Odorless Solvent 3440. The mixture is tested as in Example I, above. The Wratten 29 filter is used to expose the plate to red light. The results are tabulated in Table I.

EXAMPLE X

A test is run as in Example IX above, except that a Wratten 61 filter is used in place of the Wratten 29 filter, thus exposing the plate to green light. See Table I for results.

EXAMPLE XI

A test is run as in Example IX above, except that a Wratten 47b filter is used in place of the Wratten 29 filter, thus exposing the plate to blue light. See Table I for results.

EXAMPLE XII

A test is run as in Example IX above, except that no Wratten filter is used, thus exposing the plate to white light. See Table I for results.

EXAMPLE XIII

A test is run as in Example I above, except that the pigment here is the lead lake of 2,7-dinitro - 4,5 - dibromo fluorescein. The plate is exposed through a Wratten 29 filter, thus exposing the plate to red light. See Table I for results.

EXAMPLE XIV

A test is run as in Example XIII above, except that a Wratten 61 filter is used in place of the Wratten 29 filter, thus exposing the plate to green light. See Table I for results.

EXAMPLE XV

A test is run as in Example XIII above, except that a Wratten 47b filter is used in place of the Wratten 29 filter, thus exposing the plate to blue light. See Table I for results.

EXAMPLE XVI

A test is run as in Example XIII above, except that no Wratten filter is used, thus exposing the image to white light. See Table I for results.

EXAMPLE XVII

About 7 parts of the aluminum lake of 2,4,5,7-tetrabromo 10,11,12,13 - tetrachlorofluorescein is suspended in about 100 parts Sohio Odorless Solvent 3440. The mixture is tested as in Example I, above. A Wratten 29 filter is used to expose the suspension to red light. Results are shown in Table I.

EXAMPLE XVIII

A test is run as in Example XVII, except that a Wratten 61 filter is used in place of the Wratten 29 filter, thus exposing the plate to green light. See Table I for results.

EXAMPLE XIX

A test is run as in Example XVII, except that a Wratten 47b filter is used in place of the Wratten 29 filter, thus exposing the plate to blue light. See Table I for results

EXAMPLE XX

A test is run as in Example XVII above, except that no filter is used, thus exposing the plate to white light. See Table I for results.

TABLE I

| Example: | Roller Potential, v. | Wratten Filter | Color Light | Speed, ft.-c. | Gamma | $D_{max}$ | $D_{min}$ |
|---|---|---|---|---|---|---|---|
| I | −3,500 | 29 | Red | None | None | None | None |
| II | −3,500 | 61 | Green | 125 | 1.7 | 0.7 | 0.1 |
| III | −3,500 | 47b | Blue | 2,000 | 1.7 | 0.7 | 0.3 |
| IV | −3,500 | None | White | 125 | 1.7 | 0.7 | 0.1 |
| V | +3,500 | 29 | Red | None | None | None | None |
| VI | +3,500 | 61 | Green | 250 | 0.75 | 0.7 | 0.1 |
| VII | +3,500 | 47b | Blue | 1,000 | 0.75 | 0.7 | 0.1 |
| VIII | +3,500 | None | White | 250 | 0.75 | 0.7 | 0.1 |
| IX | −3,000 | 29 | Red | None | None | None | None |
| X | −3,000 | 61 | Green | 400 | 1.2 | 1.2 | 0.4 |
| XI | −3,000 | 47b | Blue | 2,000 | 1.2 | 1.2 | 0.4 |
| XII | −3,000 | None | White | 400 | 1.2 | 1.2 | 0.4 |
| XIII | −3,500 | 29 | Red | None | None | None | None |
| XIV | −3,500 | 61 | Green | 250 | 2.0 | 1.1 | 0.06 |
| XV | −3,500 | 47b | Blue | 2,000 | 2.0 | 1.1 | 0.1 |
| XVI | −3,500 | None | White | 250 | 2.0 | 1.1 | 0.06 |
| XVII | +3,500 | 29 | Red | None | None | None | None |
| XVIII | +3,500 | 61 | Green | 1,000 | 0.35 | 1.0 | 0.05 |
| XIX | +3,500 | 47b | Blue | None | None | None | None |
| XX | +3,500 | None | White | 1,000 | 0.35 | 1.0 | 0.05 |

The electrophoretic sensitivity of the various pigments to red, green, blue and white light is tested according to conventional photographic methods and the results are recorded in Table I, above. In the table, the first column lists the number of the test example. The second column gives the positive or negative electrical potential applied to the roller electrode in volts. The Wratten filters used in each example between the light source and the NESA plate are listed in column three. The fourth column lists the color of the light which is permitted to fall on the NESA plate. The fifth column gives the photographic speed of the photosensitive mix in foot candles. The photographic speed is the result of a curve of optical density plotted against the logarithm of exposure in foot candles. Gamma, as listed in column 6, is a standard photographic term referring to the slope of the above mentioned curve. The maximum and minimum reflection density produced are listed in column 7 and 8, respectively. As shown by the above table, the tested magenta pigments are sensitive, in an electrophoretic sense, primarily to green light with some blue sensitivity. As can be seen, the pigments are essentially non-responsive to red light, having slight, negligible, response to blue light. Thus, the response to these pigments to white light is essentially identical to their response to green light.

In each of Examples XXI–XXIV below, a suspension including equal amounts of three different colored pigments is made up by dispersing the pigments in finely divided form in Sohio Odorless Solvent 3440 so that the pigments constitute about 8% by weight of the mixture. This mixture may be referred to as a "tri-mix." The mixtures are individually tested by coating them on a NESA glass substrate and exposing them as in Example I above, except that a multicolor Kodachrome transparency is interposed between the light source and the plate instead of the neutral density and Wratten filters. Thus, a multicolored image is projected on the plate as the roller moves across the surface of the coated NESA glass substrate. A Baryta paper blocking electrode is employed and the roller is held at a negative potential of about 2500 volts with respect to the substrate. The roller is passed over the substrate six times, being cleaned after each pass. Potential application and exposure are both continued during the entire period of the six passes by the roller. After completion of the six passes, the quality of the image left on the substrate is evaluated as to density and color separation.

EXAMPLE XXI

The pigments are, as magenta the lead lake of 2,4,5,7-tetrabromo fluorescein; as cyan, Monolite Fast Blue G.S., the alpha form of metal-free phthalocyanine, C.I. No. 74100, available from the Arnold Hoffman Company; and as a yellow pigment 8,13-dioxodinaphtho-(1,2-2',3')-furan-6-carbox-p-cyanoanilide, prepared as described in copending application Ser. No. 421,377, filed Dec. 28, 1964. This tri-mix, when exposed to a multi-colored image, produces a full color image with good density and color separation.

EXAMPLE XXII

The pigment suspension consists of a magenta pigment, the lead lake of 2,7-dinitro-4,5-dibromo fluorescein, a cyan pigment, Cyan GTNF, the beta form of copper phthalocyanine, C.I. No. 74160, available from Collway Colors Company, and a yellow pigment, Algol Yellow GC, C.I. No. 67300, 1,2,5,6-di(C C'-diphenyl)-thiazole-anthraquinone available from General Dyestuffs. This tri-mix is exposed to a multicolored image and produces a full color image conforming to the original.

EXAMPLE XXIII

The pigment suspension consists of a magenta pigment, the lead lake of 2,4,5,7-tetrabromofluorescein methyl ester; a cyan pigment, Cyan Blue, 3,3'-methoxy-4-4'-diphenyl-bis (1''-azo-2''-hydroxy-3''-naphthanilide), C.I. No. 21180, available from Harmon Colors, and a yellow pigment N - 2'' - pyridyl - 8,13 - dioxodinaphtho-(1,2-2',3') - furan - 6-carboxamide, prepared as described in copending application Ser. No. 421,281, filed Dec. 28, 1964. This tri-mix is exposed to a multicolored image and produces a full color image of good density and excellent color separation.

EXAMPLE XXIV

The pigment suspension consists of a magenta pigment, the aluminum lake of 2,4,5,7-tetrabromo-10,11,12,13-tetrachloro fluorescein; a cyan pigment, Cyan Blue XR, the alpha form of copper phthalocyanine, available from Collway Colors, and as a yellow pigment, 8,13-dioxodinaphtho-(1,2-2',3')-furan-6-carbox-(3''-cyano-5''-methoxy) anilide, prepared as described in copending application Ser. No. 421,377, filed Dec. 28, 1964. This tri-mix is exposed to a multi-colored image and produces a full color image.

Although specific components and proportions have been described in the above examples relating to electrophoretic imaging systems, other suitable materials, as listed above, may be used with similar results. In addition, other materials may be added to the pigment compositions to synergize, enhance, or otherwise modify their properties. The pigment compositons of this invention may be dye sensitized, if desired, or may be mixed or otherwise combined with other photoconductors, both organic and inorganic.

Other modifications and ramifications of the present invention will occur to those skilled in the art upon a reading of the present disclosure. These are intended to be included within the scope of this invention.

What is claimed is:

1. The method of electrophoretic imaging comprising subjecting a layer of a suspension to an applied electric field between at least a pair of electrodes, at least one of which is partially transparent, and simultaneously exposing said suspension to an image through said transparent electrode with activating electromagnetic radiation whereby a pigment image made up of migrated particles is formed on at least one of said electrodes; said suspension comprising a plurality of finely divided particles of at least one color, said particles of one color comprising a photosensitive pigment having the general formula:

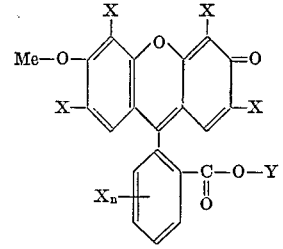

wherein:
  each X is selected from the group consisting of H, $NO_2$ and the halogens;
  Me is a metal ion selected from the group consisting of lead, aluminum and chromium;
  Y is selected from the group consisting of H and lower alkyl radicals; and
  $n$ is a positive integer from 1 to 4.

2. The method of claim 1 wherein said photosensitive pigment is the lead lake of 2,7-dinitro-4,5-dibromofluorescein.

3. The method of claim 1 wherein said photosensitive pigment is the lead lake of 2,4,5,7-tetrabromofluorescein.

4. The method of claim 1 wherein one of said electrodes is a blocking electrode.

5. The method of electrophoretic imaging comprising subjecting a layer of a suspension to an applied electric field between a pair of electrodes, at least one of which is at least partly transparent, said suspension comprising a plurality of finely divided particles of at least two different colors in an insulating carrier liquid, the particles of each color comprising a photosensitive pigment whose principal light absorption band substantially coincides with its principal photosensitive response, simultaneously exposing said suspension to a light image through said partially transparent electrode and then separating said electrodes whereby a migrated pigment image is formed on the surface of at least one of said electrodes, the particles of one color comprising compositions having the general formula:

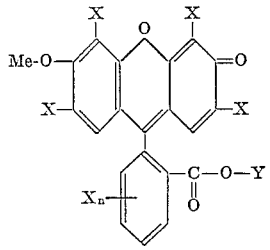

wherein:
each X is selected from the group consisting of H, NO₂ and the halogens;
Me is a metal ion selected from the group consisting of lead, aluminum and chromium;
Y is selected from the group consisting of H and lower alkyl radicals; and
$n$ is a positive integer from 1 to 4.

6. The method of claim 5 wherein said photosensitive pigment is the lead lake of 2,7-dinitro-4,5,-dibromofluorescein.

7. The method of claim 5 wherein said photosensitive pigment is the lead lake of 2,4,5,7-tetrabromofluorescein.

8. The method of claim 5 wherein one of said electrodes is a blocking electrode.

9. An imaging suspension for polychromatic electrophoretic imaging comprising
an insulating carrier liquid having suspended therein photosensitive cyan particles, responding primarily to red light, photosensitive yellow particles responding primarily to blue light and photosensitive magenta particles comprising the composition having the general formula:

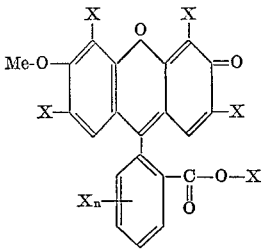

wherein:
each X is selected from the group consisting of H, NO₂ and the halogens;
Me is a metal ion selected from the group consisting of lead, aluminum and chromium;
Y is selected from the group consisting of H and lower alkyl radicals; and
$n$ is a positive integer from 1 to 4.

10. The suspension of claim 9 wherein said photosensitive pigment is the lead lake of 2,7-dinitro-4,5,-dibromofluorescein.

11. The suspension of claim 9 wherein said photosensitive pigment is the lead lake of 2,4,5,7-tetrabromofluorescein.

References Cited

UNITED STATES PATENTS

| 2,865,771 | 12/1958 | Thompson | 106—23 |
| 3,072,479 | 1/1963 | Bethe | 96—1 |
| 3,384,565 | 5/1968 | Tulogin | 204—181 |

GEORGE F. LESMES, Primary Examiner

JOHN C. COOPER, Assistant Examiner

U.S. Cl. X.R.

8—97; 96—1, 1.2, 1.5; 117—37; 204—181; 260—335